United States Patent
Ishigami

(10) Patent No.: US 10,737,671 B2
(45) Date of Patent: Aug. 11, 2020

(54) BRAKING PERFORMANCE EVALUATION METHOD AND BRAKING PERFORMANCE EVALUATION DEVICE

(71) Applicant: Toyo Tire & Rubber Co., Ltd., Itami-shi, Hyogo (JP)

(72) Inventor: Naohiro Ishigami, Itami (JP)

(73) Assignee: TOYO TIRE CORPORATION, Itami-shi (JP)

(*) Notice: Subject to any disclaimer, the term of this patent is extended or adjusted under 35 U.S.C. 154(b) by 149 days.

(21) Appl. No.: 16/192,132

(22) Filed: Nov. 15, 2018

(65) Prior Publication Data
US 2019/0161066 A1 May 30, 2019

(30) Foreign Application Priority Data
Nov. 29, 2017 (JP) .................... 2017-229311

(51) Int. Cl.
*B60T 8/172* (2006.01)
*B60C 11/00* (2006.01)
(Continued)

(52) U.S. Cl.
CPC ............ *B60T 8/1725* (2013.01); *B60T 8/172* (2013.01); *B60C 11/00* (2013.01); *B60C 11/03* (2013.01);
(Continued)

(58) Field of Classification Search
CPC ... B60C 11/0309; B60C 1/00; B60C 11/1218; B60C 11/1272; B60C 11/00;
(Continued)

(56) References Cited

U.S. PATENT DOCUMENTS 6,076,579 A * 6/2000 Matsumoto ......... B60C 11/0309
152/209.15
6,506,849 B1 * 1/2003 Hojo ........................ B60C 1/00
525/332.7
(Continued)

FOREIGN PATENT DOCUMENTS

JP 2002-14011 A 1/2002
JP 2003-57134 A 2/2003
(Continued)

*Primary Examiner* — Behrang Badii
(74) *Attorney, Agent, or Firm* — Westerman, Hattori, Daniels & Adrian, LLP

(57) ABSTRACT

In a braking performance evaluation method including the steps of acquiring a tire ground contact pressure distribution, acquiring a sliding friction coefficient table, and calculating a friction force of an entire tire using a brush model having a function representing the tire ground contact pressure distribution and the sliding friction coefficient table, the step of acquiring the tire ground contact pressure distribution includes the step of acquiring a first ground contact pressure distribution on a road surface on which no water film is present via actual measurement or calculation and the step of acquiring a second ground contact pressure distribution by applying reduction in a ground contact pressure due to a water film intruded between the tire and the road surface to the first ground contact pressure distribution and using the second ground contact pressure distribution as the tire ground contact pressure distribution used for the calculating.

9 Claims, 8 Drawing Sheets

(51) Int. Cl.
*C08K 5/17* (2006.01)
*B60C 11/13* (2006.01)
*B60C 11/03* (2006.01)
*B60C 11/11* (2006.01)

(52) U.S. Cl.
CPC ............... *B60C 11/11* (2013.01); *B60C 11/13* (2013.01); *B60T 2210/12* (2013.01); *B60T 2240/03* (2013.01); *B60T 2240/06* (2013.01); *B60T 2270/86* (2013.01); *C08K 5/17* (2013.01)

(58) Field of Classification Search
CPC . B60C 11/13; B60C 11/1384; B60C 11/1392; B60C 1/0016; B60C 11/11; B60C 11/1281; B60C 11/1376; B60C 11/03; B60C 11/12; B60C 11/0302; B60C 11/1236; B60C 11/0083; B60C 99/006; B60C 19/00; G06F 3/0233; G06F 30/15; G06F 30/23; G06F 3/0414; G06F 3/0237; G06F 3/04883; A01B 63/023; A01B 71/02; A01B 79/005; B60T 8/1725; B60T 8/172; B60T 2210/12; B60T 2240/03; B60T 2240/06; B60T 2270/86; C08K 5/17; C08K 5/24; C08L 21/00; C08L 79/02; C08L 9/06
See application file for complete search history.

(56) References Cited

U.S. PATENT DOCUMENTS

| | | | |
|---|---|---|---|
| 2011/0290392 A1* | 12/2011 | Ohashi | B60C 11/1218 152/209.18 |
| 2011/0315289 A1* | 12/2011 | Ohashi | B60C 11/12 152/209.18 |
| 2012/0090749 A1* | 4/2012 | Ohashi | B60C 11/1218 152/209.18 |
| 2019/0210407 A1* | 7/2019 | Hiraishi | B60C 11/1272 |

FOREIGN PATENT DOCUMENTS

| | | |
|---|---|---|
| JP | 2004-338660 A | 12/2004 |
| JP | 2007-203809 A | 8/2007 |

* cited by examiner

FIG. 3

| SLIDING SPEED (km/h) | GROUND CONTACT PRESSURE (Pa) | | | | | |
|---|---|---|---|---|---|---|
| | $1.0 \times 10^5$ | $2.0 \times 10^5$ | $4.0 \times 10^5$ | $6.0 \times 10^5$ | $8.0 \times 10^5$ |
| 0 | 0.98 | 0.93 | 0.81 | 0.75 | 0.71 |
| 2.5 | 0.77 | 0.75 | 0.69 | 0.60 | 0.58 |
| 5 | 0.72 | 0.70 | 0.62 | 0.58 | 0.56 |
| 10 | 0.69 | 0.67 | 0.61 | 0.56 | 0.54 |
| 15 | 0.65 | 0.62 | 0.58 | 0.54 | 0.52 |
| 20 | 0.63 | 0.60 | 0.55 | 0.53 | 0.50 |

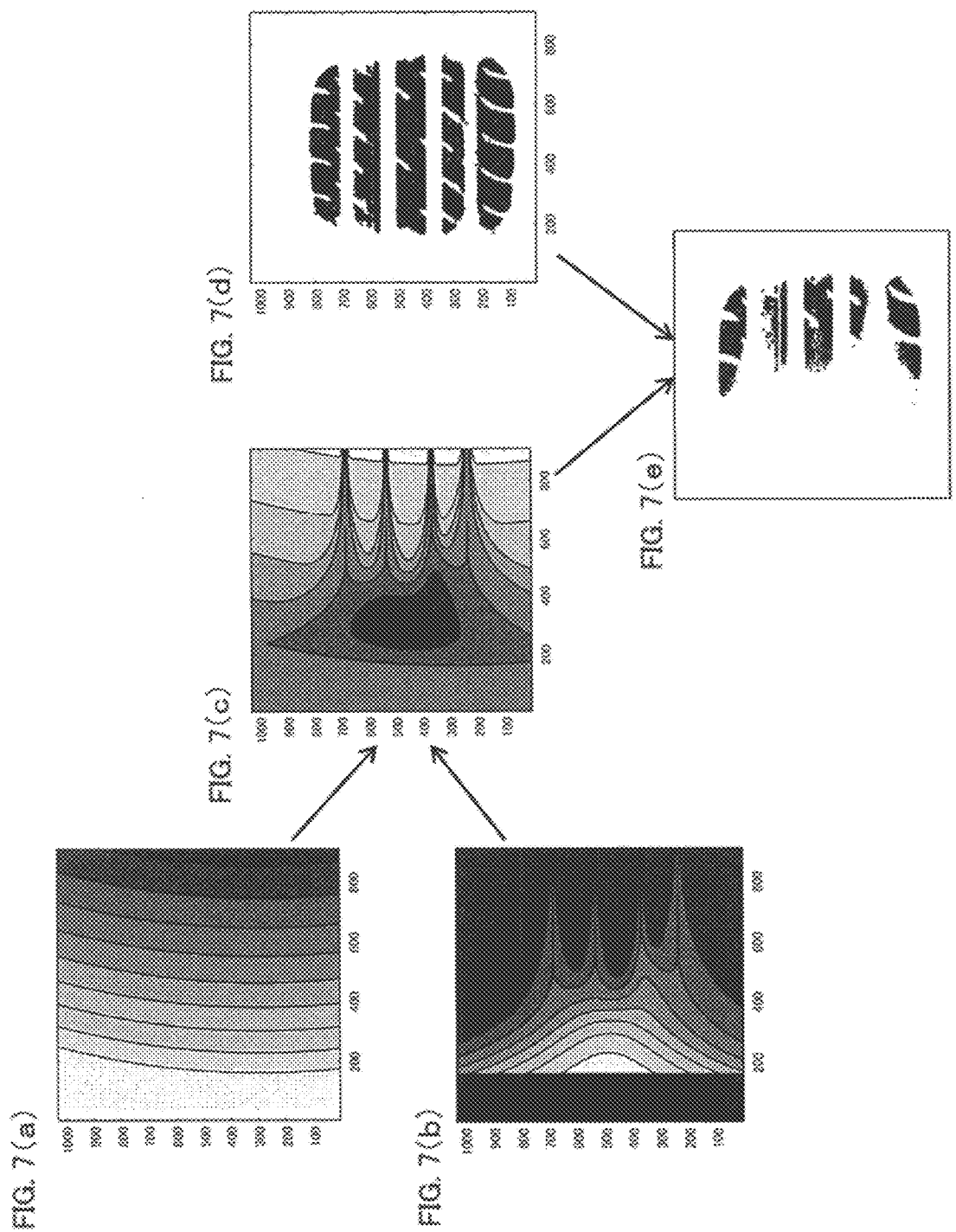

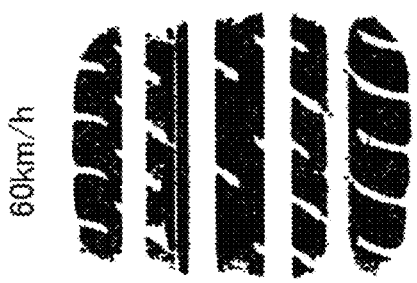
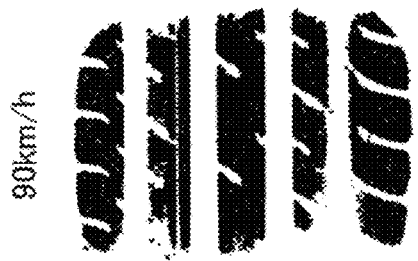
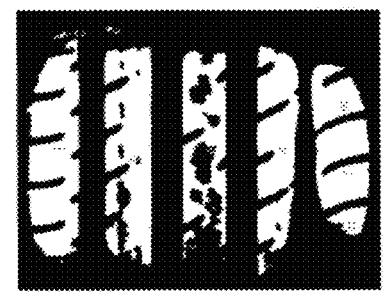
FIG. 8(a)
FIG. 8(b)

BRAKING PERFORMANCE EVALUATION METHOD AND BRAKING PERFORMANCE EVALUATION DEVICE

CROSS-REFERENCE TO RELATED APPLICATIONS

This application is based upon and claims the benefit of priority from the prior Japanese Patent Application No. 2017-229311, filed on Nov. 29, 2017; the entire contents of which are incorporated herein by reference.

TECHNICAL FIELD

The present invention relates to a braking performance evaluation method and a braking performance evaluation device.

BACKGROUND ART

Although the braking performance on a WET road surface (that is, a wet road surface) of tires attached to an actual vehicle has been conventionally evaluated by attaching actual tires to the vehicle and traveling the vehicle, this evaluation method has a problem in that the test cost is expensive.

Accordingly, there are methods as described in PTL 1 and PTL 2 that construct a tire model, a road surface model, and a fluid model in which a water film between tires and the road surface is modeled and perform simulation using these models. However, since the calculation costs of these methods are high, they are not suited for analysis combined with a vehicle model.

In addition, there is a known method as described in PTL 3 and PTL 4 that acquires a μ-S curve representing the relationship between a friction coefficient μ and a slip ratio S of a tire by using a tire model (brush model) in which a brush-like elastic element corresponding to a tread rubber is radially pasted to the outer periphery of a cylindrical belt.

PTL 1: JP-A-2002-14011
PTL 2: JP-A-2004-338660
PTL 3: JP-A-2007-203809
PTL 4: JP-A-2003-57134

SUMMARY OF THE INVENTION

An issue of the invention is to provide a method and device that evaluate the braking performance of tires on a WET road surface at low calculation cost.

A braking performance evaluation method according to an embodiment includes the steps of acquiring a tire ground contact pressure distribution, acquiring a sliding friction coefficient table, and calculating a friction force of an entire tire using a brush model having a function representing the ground contact pressure distribution and the sliding friction coefficient table, in which the step of acquiring the tire ground contact pressure distribution includes the step of acquiring a first ground contact pressure distribution on a road surface on which no water film is present via actual measurement or calculation and the step of acquiring a second ground contact pressure distribution by applying reduction in a ground contact pressure due to a water film intruded between the tire and the road surface to the first ground contact pressure distribution and using the second ground contact pressure distribution as the tire ground contact pressure distribution used for the calculating.

In addition, a braking performance evaluation device according to the embodiment acquires a tire ground contact pressure distribution and a sliding friction coefficient table and calculates a friction force of an entire tire using a brush model having a function representing the ground contact pressure distribution and the sliding friction coefficient table, in which a second ground contact pressure distribution is acquired by applying reduction in a ground contact pressure due to a water film intruded between the tire and the road surface to a first ground contact pressure distribution input from an input device on a road surface on which no water film is present and the second ground contact pressure distribution is used as the tire ground contact pressure distribution used for the calculating.

According to the invention, since braking performance on a WET surface can be evaluated without using a fluid model in which a water film between the tire and the road surface is modeled, calculation cost can be suppressed.

BRIEF DESCRIPTION OF THE DRAWINGS

FIG. 3 illustrates an example of a sliding friction coefficient table.

FIG. 5($a$) illustrates the relationship between a lapse of time t and change in a slip ratio S.
FIG. 5($b$) illustrates the relationship between a lapse of time t and change in a vehicle speed $V_x$.

FIG. 6($a$) illustrates an exponential function.
FIG. 6($b$) illustrates a Gaussian function.

FIGS. 7($a$) to 7($e$) illustrate how to acquire a second ground contact pressure distribution by applying the lift function to a first ground contact pressure distribution. FIG. 7($a$) illustrates a first lift function. FIG. 7($b$) illustrates a second lift function. FIG. 7($c$) illustrates a lift map. FIG. 7($d$) illustrates the first ground contact pressure distribution. FIG. 7($e$) illustrates the second ground contact pressure distribution.

FIGS. 8($a$) and 8($b$) illustrate an example. FIG. 8($a$) illustrates the second ground contact pressure distribution acquired by the method according to the embodiment and black parts indicate parts in contact with the ground. FIG. 8($b$) illustrates images of actual tire ground contact states and white parts indicate parts in contact with the ground.

MODE FOR CARRYING OUT THE INVENTION

The embodiment will be described with reference to the drawings. It should be noted here that the embodiment is only an example and an implementation acquired by changing the embodiment as appropriate without departing from the spirit of the invention is also included in the scope of the invention. In addition, the drawings may be illustrated with sizes or shapes or the like exaggerated or may be illustrated schematically for purposes of explanation. However, such drawings are only examples and do not limit the interpretation of the invention.

1. Evaluation Device and Evaluation Method

Figure 1:
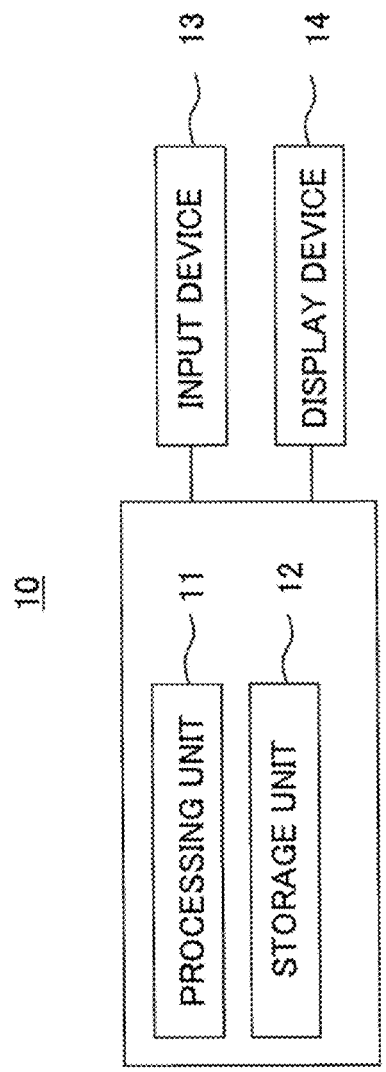
FIG. 1 illustrates an evaluation device according to an embodiment.

FIG. 1 illustrates an evaluation device 10 that executes the evaluation method according to the embodiment. The evaluation device 10 is, for example, a computer and includes a processing unit 11, a storage unit 12, an input device 13 to which information required to execute the evaluation method according to the embodiment is input, and a display device 14 on which the evaluation result is displayed. The storage unit 12 stores a program for executing the evaluation method according to the embodiment and the processing unit 11 reads this program and executes the following evaluation method.

The evaluation method according to the embodiment will be described with reference to FIG. 2. First, the ground contact pressure distribution of a tire is acquired (ST1 in FIG. 2). The ground contact pressure distribution acquired here is referred to as the "first ground contact pressure distribution". The first ground contact pressure distribution is preferably a ground contact pressure distribution when a longitudinal force during braking is applied to the tire and preferably a ground contact pressure distribution under a dynamic front and rear wheel load condition. The dynamic front and rear wheel load condition is a condition under which the load applied to the front wheels during braking becomes larger than the load applied to the front wheels before braking and the load applied to the rear wheels during braking becomes smaller than the load applied to the rear wheels before braking. The first ground contact pressure distribution may be acquired via actual measurement or may be obtained via calculation. The first ground contact pressure distribution by actual measurement is acquired on a dry road surface having no water film thereon and the first ground contact pressure distribution by calculation does not consider intrusion of a water film between the tire and the road surface.

Figure 2:
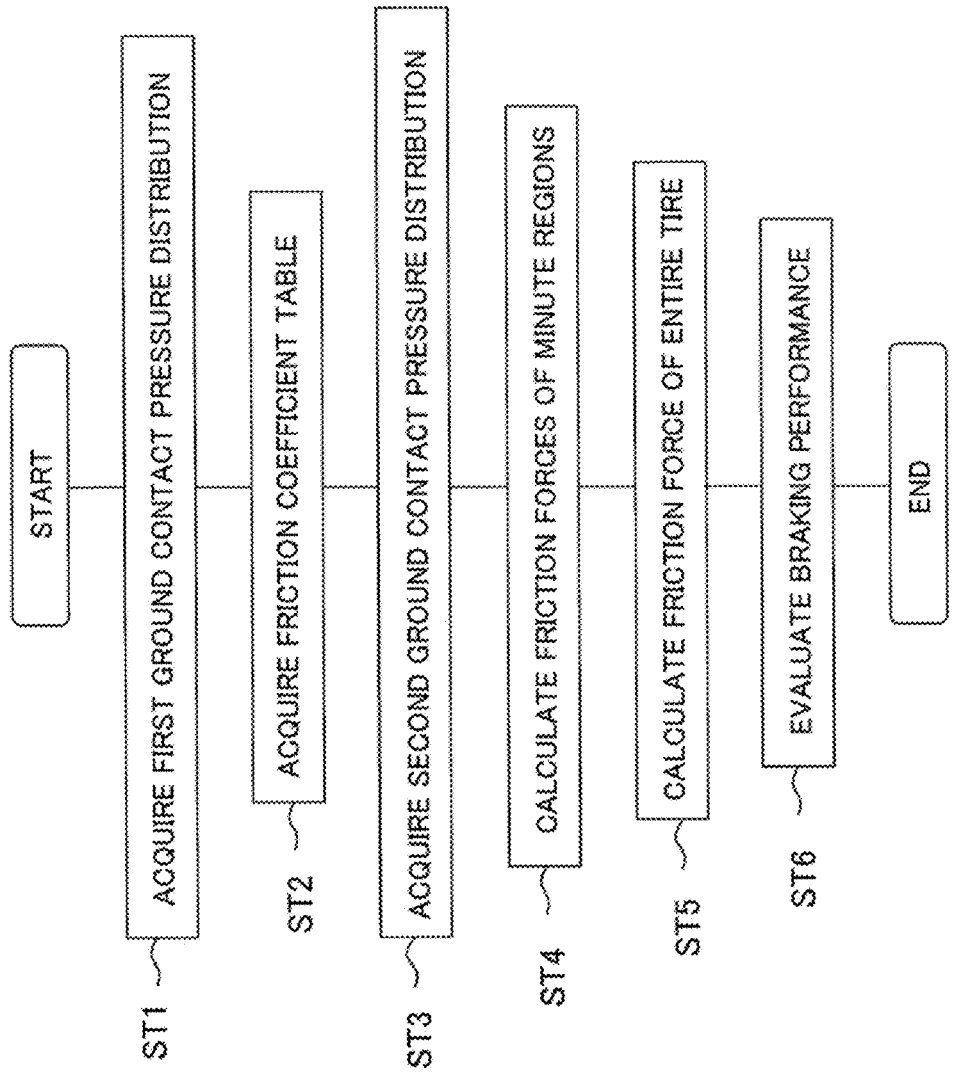
FIG. 2 is a flowchart illustrating an evaluation method according to the embodiment.

Next, a sliding friction coefficient table is acquired (ST2 in FIG. 2). The sliding friction coefficient table is a table of sliding friction coefficients that correspond to ground contact pressures and sliding speeds and is acquired via experiment. An example of the sliding friction coefficient table will be illustrated in FIG. 3 for the purpose of reference. In should be noted here that the sliding friction coefficient table and the first ground contact pressure distribution described above are input from the input device 13.

Next, the second ground contact pressure distribution is acquired by applying the effect of the water film intruded between the tire and the road surface to the first ground contact pressure distribution (ST3 in FIG. 2). How to acquire the second ground contact pressure distribution will be described later. Based on the second ground contact pressure distribution, the effective ground contact length in the tire circumferential direction (that is, the ground contact length in the region in which the ground contact pressure is nonzero in the second ground contact pressure distribution and a ground contact length L in the following calculation) and the effective ground contact width in the tire width direction (that is, the ground contact width in a region in which the ground contact pressure is nonzero in the second ground contact pressure distribution and the ground contact width acquired by totalizing the minute regions described later) are obtained.

Figure 4B:
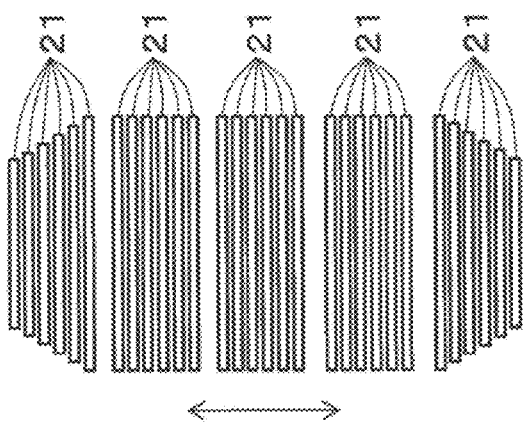
FIG. 4($a$) illustrates a ground contact surface of a tire and
FIG. 4($b$) illustrates many minute regions acquired by dividing the ground contact surface. The arrows in the drawings indicate a tire width direction.
Figure 4A:
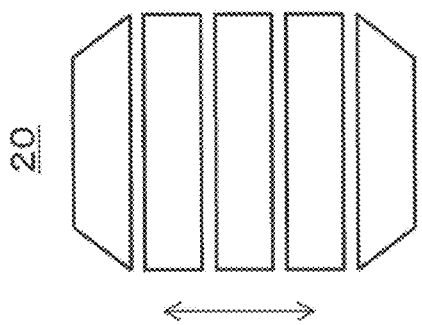

Next, a ground contact surface 20 of the tire illustrated in FIG. 4(a) is divided into a plurality of minute regions 21 in the tire width direction as illustrated in FIG. 4(b), the friction forces of these minute regions 21 are calculated (ST4 in FIG. 2). This calculation uses a brush model of a tire. In the brush model, a friction force Fi(S) of the i-th region among the minute regions acquired by dividing a tire in the width direction at a slip ratio S is represented by the following expression:

$$Fi(S) = \Delta w \cdot \left\{ \int_0^{L_h} Cx \cdot S \cdot tdt + \int_{L_h}^{L} D(t, yi) \cdot \mu(D(t, yi), V(S)) \, dt \right\}$$ [Math. 1]

where $\Delta w$ is the width (mm) of the minute regions acquired by dividing the ground contact surface in the tire width direction, L is the ground contact length (mm) in the tire circumferential direction, $\mu(P, V)$ is the friction coefficient represented as a function of a pressure P and a sliding speed V, $D(x, y)$ is the function representing the ground contact pressure distribution, yi is the coordinate value in the middle in the width direction of the i-th minute region, $V(S)$ is the sliding speed at the slip ratio S, and $C_x$ is the shearing elastic constant of the tread rubber of the tire. In addition, since braking when the tire has an adhesion area and a sliding area is assumed here, the slip ratio S is larger than 0 and smaller than the adhesion slip ratio. This expression represents the sum of the term of the friction force generated in the adhesion area and the term of the friction force generated in the sliding area. In this expression, the friction coefficient acquired from the friction coefficient table is used as the friction coefficient $\mu(P, V)$ and the second ground contact pressure distribution is used as the ground contact pressure distribution $D(x, y)$.

In addition, $L_h$ is the border coordinate between the adhesion area and the sliding area of the tire and meets the following relationship.

$$C_x \cdot L_h \cdot S = \mu(D(L_h, yi), 0) \cdot D(L_h, yi) \cdot \Delta w$$ [Math. 2]

Next, the friction force of the entire tire is calculated based on the friction forces Fi(S) of the minute regions acquired by dividing the tire in the width direction (ST5 in FIG. 2). The calculation method for this friction force will be described later.

Next, the braking performance will be evaluated based on the calculated friction force (ST6 in FIG. 2).

For example, the braking distance of a vehicle having an ABS (Antilock Brake System) is calculated as the braking performance. Specifically, a vehicle model having an ABS and a tire model coupled thereto are first constructed. In addition, a feedback loop is constructed in which the slip ratio S and the vehicle speed $V_x$ are input from the vehicle model to the tire model and the friction force is output from the tire model to the vehicle model.

Figure 5A:
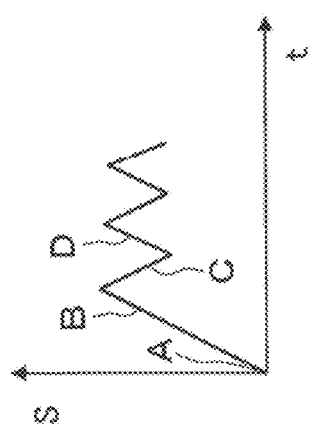
FIGS. 5($a$) and 5($b$) illustrate effects of control by an ABS.
Figure 5B:
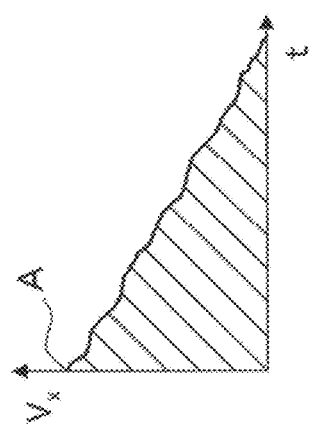

Control of the slip ratio S by an ABS will be described with reference to FIGS. 5(a) and 5(b). First, a braking toque generated when a brake is applied in a vehicle is input (A in FIGS. 5(a) and 5(b)). When the braking torque is input, the slip ratio S of a tire and the tire friction coefficient $\mu$ (the tire friction coefficient $\mu$ is acquired by dividing the friction force of the entire tire by the load applied to the entire tire) starts increasing (B in FIG. 5(a)), a friction force is generated, and the vehicle speed $V_x$ starts reducing. When the tire friction coefficient $\mu$ exceeds a maximum value $\mu_{peak}$ the control torque is reduced by ABS control, the slip ratio S is reduced (C in FIG. 5(a)) by the effect thereof, and the tire friction coefficient μ changes. When the tire friction coefficient μ becomes smaller than the maximum value $\mu_{peak}$, the braking torque is increased by ABS control, the slip ratio S is increased (D in FIG. 5(a)) by the effect thereof, and the tire friction coefficient μ changes. Then, ABS control is performed so that the tire friction coefficient μ increases or reduces in the vicinity of the maximum value $\mu_{peak}$, the slip ratio S fluctuates, the friction force of the tire fluctuates accordingly, and the vehicle speed $V_x$ continues reducing to 0 finally.

By constructing a vehicle braking simulation model including an ABS control model, the tire friction coefficient μ and the friction force in the process from when input of a braking torque starts in the tire model to when the vehicle speed $V_x$ reduces to 0 are calculated in the method described above. Then, the braking distance of the vehicle is calculated based on changes in the vehicle speed $V_x$. The braking distance is equivalent to the area of the hatched part in FIG. 5(b).

2. Acquisition Method for the Second Ground Contact Pressure Distribution

Next, how to acquire the second ground contact pressure distribution in the above flow will be described. In the first ground contact pressure distribution, the effect of a water film intruded between the tire and the road surface is not considered. The second ground contact pressure distribution is acquired by applying the effect of a water film intruded between the tire and the road surface to the first ground contact pressure distribution.

In order to consider the effect of a water film intruded between the tire and the road surface, a function (referred to below as a "lift function") is set to reproduce a phenomenon in which a water film reduces the ground contact pressure of the tire and lifts the tire. Items related to lifting of the tire are assumed to set the lift function. Specifically, the following assumptions are made.
(1) The tire is lifted more easily as the tire rotates at higher speed.
(2) The part closer to the leading side during rotation is lifted more easily.
(3) The part closer to the main groove is lifted more easily.
(4) The tire having a narrower main groove is lifted more easily.
(5) The part having a ground contact pressure equal to less than a certain threshold is considered to be completely lifted off the road surface and the ground contact pressure is considered to be 0.

Any functions that reproduce part or all of these assumptions are set as lift functions. The number of functions to be set may be one or more than one.

For example, the following exponential function is set as a function (referred to below as the "first lift function") that reproduces assumption (1) and assumption (2).

$$F(x) = p \cdot a^x \qquad \text{[Math. 3]}$$

In addition, the following Gaussian function is set as a function (referred to below as the "second lift function") that reproduces assumption (3) and assumption (4).

$$G(y) = q \cdot \exp\left\{-\frac{(y-b)^2}{2c^2}\right\} \qquad \text{[Math. 4]}$$

Figure 6A:
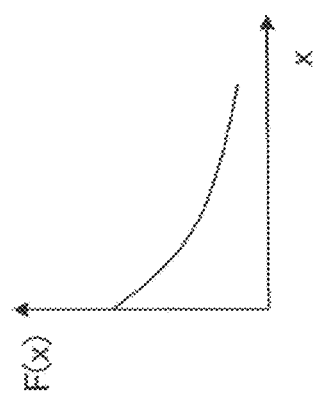
FIGS. 6($a$) and 6($b$) illustrate an example of a lift function.
Figure 6B:
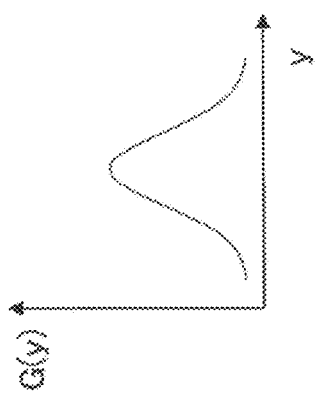

The exponential function F(x) is illustrated in FIG. 6(a) and the Gaussian function G(y) is illustrated in FIG. 6(b). The independent variable x represents a position in the tire circumferential direction and increases toward the trailing side from the leading side of the tire. In addition, the independent variable y represents a position in the tire width direction and the middle position of each main groove is set as y=0. The Gaussian function G(y) is set for each main groove. In addition, 0<a<1 holds, b is a value defined based on the position of the main groove, and c is a value defined based on the width of the main groove or the like. In addition, p and q are any constants. A part with larger values acquired by these functions has a smaller ground contact pressure. It should be noted here that selection of the functions is only an example.

After the lift functions are set, the lift functions are applied to the first ground contact pressure distribution so as to be able to reproduce the above assumptions. This acquires the second ground contact pressure distribution in which reduction in the ground contact pressure of the tire due to a water film is reproduced.

Here, a specific example of acquiring the second ground contact pressure distribution by applying the lift functions to the first ground contact pressure distribution will be described with reference to FIGS. 7(a) to 7(e). In this example, the first lift function and the second lift function are assumed to be set as the lift functions.

FIG. 7(a) illustrates the first lift function and a brighter part has a larger value and is more likely to be lifted. It should be noted here that the left side in FIGS. 7(a) to (e) indicates the leading side of the tire. Accordingly, FIG. 7(a) illustrates the effect of intrusion of a water film from the leading side. In addition, FIG. 7(b) illustrates the second lift function and a brighter part has a larger value and is more likely to be lifted. FIG. 7(b) illustrates the effect of intrusion of a water film from the main groove. The second lift function in FIG. 7(b) is set so as to have wider effects toward the leading side of the tire.

Next, the lift coefficient is introduced based on the lift functions. The lift coefficient becomes smaller in a position in which lifting is caused more easily. Accordingly, when the first ground contact pressure distribution is multiplied by the lift coefficient, the ground contact pressure becomes smaller in a position in which lifting is caused more easily.

Specifically, the values acquired by subtracting dependent variables in individual positions of the first lift function from the maximum value of the dependent variables of the first lift function are the first lift coefficients in the individual positions on the ground contact surface (for example, when the maximum value of the dependent variables of the first lift function is 1.0 and the dependent variable of the first lift function in a certain position on the ground contact surface is 0.2, the first lift coefficient at that position is 1.0−0.2=0.8). The first lift coefficient becomes smaller in a position in which lifting is caused more easily. Similarly, the values acquired by subtracting dependent variables in individual positions of the second lift function from the maximum value of the dependent variables of the second lift function are the second lift coefficients in the individual positions on the ground contact surface. The second lift coefficient becomes smaller in a position in which lifting is caused more easily.

Next, the final lift coefficient is acquired by multiplying the first lift coefficient by the second lift coefficient in each position. The final lift coefficient becomes smaller in a position in which lifting is caused more easily. The distribution of the final lift coefficients is illustrated in the lift map in FIG. 7(c). In the lift map, a darker part has a smaller coefficient and is more likely to be lifted.

The final lift coefficients illustrated in this lift map are multiplied by the ground contact pressures in the individual positions in the first ground contact pressure distribution illustrated in FIG. 7(d) and the ground contact pressures in the position in which the results are equal to or less than a predetermined threshold are set to 0 to acquire the second ground contact pressure distribution illustrated in FIG. 7(e). The second ground contact pressure distribution can be represented as a function.

The second ground contact pressure distribution acquired as described above is used in the flow of the above evaluation method.

3. Calculation Method for the Friction Force of the Entire Tire

Next, the calculation method for the friction force of the entire tire in the above flow will be described with reference to FIGS. 4(a) and 4(b).

First, the ground contact surface 20 of the tire illustrated in FIG. 4(a) is divided into many minute regions 21 in the tire width direction as illustrated in FIG. 4(b). Each of the divided minute regions 21 has the ground contact length L in the tire circumferential direction. All of the minute regions 21 constitute the original ground contact surface 20. Each of the minute regions 21 has the second ground contact pressure distribution. The second ground contact pressure distribution of each of the minute regions 21 is referred to as a "tire circumferential direction ground contact pressure distribution".

Next, the friction force of each of the minute regions 21 is calculated. Specifically, the tire circumferential direction ground contact pressure distribution $D(x, y_i)$ is built into the above expression $F_i(S)$ of the brush model. Then, the friction force of the minute region 21 is calculated by providing the predetermined slip ratio S for the expression $F_i(S)$ of the brush model. The friction force is referred to as a "tire circumferential direction friction force". The tire circumferential direction friction force is calculated for all of the minute regions 21 from one end to the other end in the tire width direction.

Next, all of the calculated tire circumferential direction friction forces are totalized as indicated below.

$$F = \sum_i F_i(S) \qquad [\text{Math. 5}]$$

This calculates the friction force of the entire tire. The friction force of the entire tire calculated as described above is used in the flow of the evaluation method described above.

4. Effects

As described above, the embodiment first acquires the first ground contact pressure distribution on the road surface having no water film via actual measurement or calculation, acquires the second ground contact pressure distribution by applying reduction in the ground contact pressure due to a water film intruded between the tire and the road surface to the first ground contact pressure distribution, and then calculates the friction force by building the second ground contact pressure distribution into the brush model. Accordingly, the ground contact pressure on a WET road surface can be reproduced accurately and the braking performance can be evaluated accurately without using a fluid model in which a water film between the tire and the road surface is modeled. In addition, the calculation cost can be suppressed since no fluid model is used.

5. Example

An example is illustrated in FIGS. 8(a) and 8(b). The drawings of FIG. 8(a) arranged in the upper row illustrate the second ground contact pressure distribution acquired by the method according to the embodiment and black parts indicate parts in contact with the ground. In addition, the drawings of FIG. 8(b) arranged in the lower row are images obtained by capturing ground contact states of an actual tire and white parts indicate parts in contact with the ground. In both FIGS. 8(a) and 8(b), the drawings illustrate the ground contact states when the tire rotates at 120 km/hour, 90 km/hour, and 60 km/hour from left to right. Comparison between black parts in FIG. 8(a) and white parts in FIG. 8(b) shows that the ground contact states of an actual tire can be reproduced accurately using the acquisition method for the second ground contact pressure distribution according to the embodiment.

The invention claimed is:

1. A braking performance evaluation method comprising the steps of:
   acquiring a tire ground contact pressure distribution;
   acquiring a sliding friction coefficient table; and
   calculating a friction force of an entire tire using a brush model having a function representing the tire ground contact pressure distribution and the sliding friction coefficient table,
   wherein the step of acquiring the tire ground contact pressure distribution includes the step of acquiring a first ground contact pressure distribution on a road surface on which no water film is present and the step of acquiring a second ground contact pressure distribution by applying reduction in a ground contact pressure due to a water film intruded between the tire and the road surface to the first ground contact pressure distribution and using the second ground contact pressure distribution as the tire ground contact pressure distribution used for the calculating.

2. The braking performance evaluation method according to claim 1,
   wherein the step of calculating the friction force of the entire tire using the brush model includes the step of calculating friction forces of minute regions acquired by dividing a ground contact surface in a tire width direction and the step of acquiring the friction force of the entire tire by totalizing the friction forces of all of the minute regions.

3. The braking performance evaluation method according to claim 1,
   wherein, when the second ground contact pressure distribution is acquired by applying the reduction in the ground contact pressure due to the water film intruded between the tire and the road surface to the first ground contact pressure distribution, one or more lift functions are set to reproduce, as an effect of intrusion of the water film between the tire and the road surface, at least part of
   an assumption that the tire is lifted more easily as the tire rotates at higher speed,
   an assumption that apart closer to a leading side during rotation is lifted more easily, an assumption that a part closer to the main groove is lifted more easily, an assumption that the tire having a narrower main groove is lifted more easily, and an assumption that a part having a ground contact pressure equal to or less than a certain threshold is considered to be completely lifted off the road surface and the ground contact pressure is considered to be 0, and the second ground contact pressure distribution is acquired by applying the one or more lift functions to the first ground contact pressure distribution.

4. The braking performance evaluation method according to claim 3, wherein an exponential function having an independent variable for representing a position in a tire circumferential direction on the ground contact surface is set as a function for reproducing the assumption that the tire is lifted more easily as the tire rotates at higher speed and the assumption that the part closer to the leading side during rotation is lifted more easily, a Gaussian function having an independent variable for representing a position in a tire width direction on the ground contact surface is set as a function for reproducing the assumption that the part closer to the main groove is lifted more easily and the assumption that the tire having the narrower main groove is lifted more easily, lift coefficients that become smaller as the dependent variables of the exponential function and the Gaussian function are larger are introduced in positions on the ground contact surface, and the lift coefficients are multiplied by the ground contact pressure of the first ground contact pressure distribution in the positions on the ground contact surface to acquire the second ground contact pressure distribution.

5. The braking performance evaluation method according to claim 1, wherein the first ground contact pressure distribution and the sliding friction coefficient table are input to a computer and the computer performs the calculating.

6. A braking performance evaluation device that acquires a tire ground contact pressure distribution and a sliding friction coefficient table and calculates a friction force of an entire tire using a brush model having a function representing the tire ground contact pressure distribution and the sliding friction coefficient table, wherein a second ground contact pressure distribution is acquired by applying reduction in a ground contact pressure due to a water film intruded between the tire and the road surface to a first ground contact pressure distribution input from an input device on a road surface on which no water film is present and the second ground contact pressure distribution is used as the tire ground contact pressure distribution used for the calculating.

7. The braking performance evaluation device according to claim 6, wherein, when the friction force of the entire tire is calculated using the brush model, friction forces of minute regions acquired by dividing a ground contact surface in a tire width direction are calculated and the friction forces of all of the minute regions are totalized to acquire the friction force of the entire tire.

8. The braking performance evaluation device according to claim 6, wherein, when the second ground contact pressure distribution is acquired by applying the reduction in the ground contact pressure due to the water film intruded between the tire and the road surface to the first ground contact pressure distribution, one or more lift functions are set to reproduce, as an effect of intrusion of the water film between the tire and the road surface, at least part of an assumption that the tire is lifted more easily as the tire rotates at higher speed, an assumption that a part closer to a leading side during rotation is lifted more easily, an assumption that a part closer to the main groove is lifted more easily, an assumption that the tire having a narrower main groove is lifted more easily, and an assumption that a part having a ground contact pressure equal to or less than a certain threshold is considered to be completely lifted off the road surface and the ground contact pressure is considered to be 0, and the second ground contact pressure distribution is acquired by applying the one or more lift functions to the first ground contact pressure distribution.

9. The braking performance evaluation device according to claim 8, wherein an exponential function having an independent variable for representing a position in a tire circumferential direction on the ground contact surface is set as a function for reproducing the assumption that the tire is lifted more easily as the tire rotates at higher speed and the assumption that the part closer to the leading side during rotation is lifted more easily, a Gaussian function having an independent variable for representing a position in a tire width direction on the ground contact surface is set as a function for reproducing the assumption that the part closer to the main groove is lifted more easily and the assumption that the tire having the narrower main groove is lifted more easily, lift coefficients that become smaller as the dependent variables of the exponential function and the Gaussian function are larger are introduced in positions on the ground contact surface, and the lift coefficients are multiplied by the ground contact pressure of the first ground contact pressure distribution in the positions on the ground contact surface to acquire the second ground contact pressure distribution.

* * * * *